May 27, 1930.　　H. B. HULL　　1,759,945
REFRIGERATING APPARATUS
Filed March 29, 1924
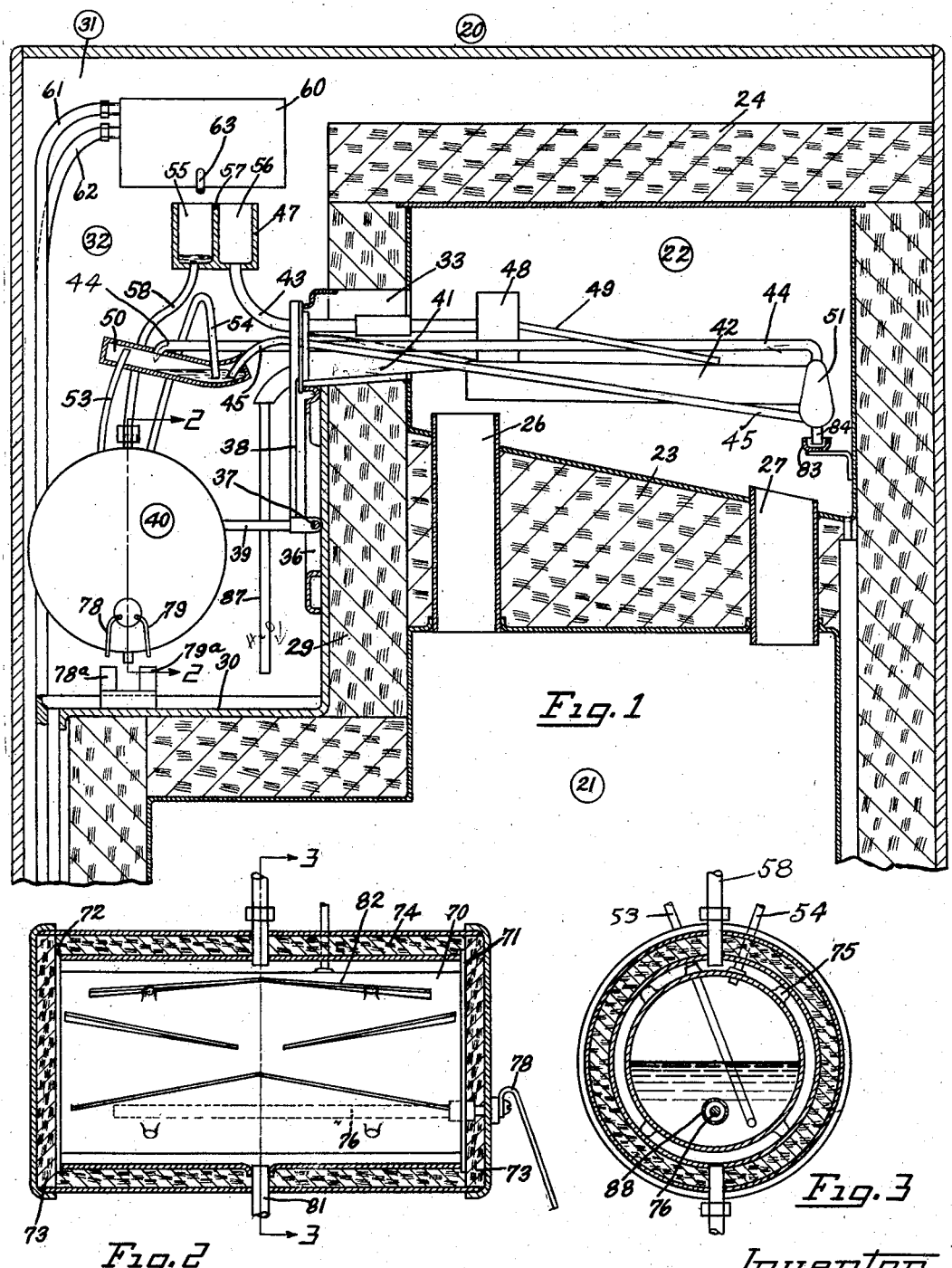

Patented May 27, 1930

1,759,945

UNITED STATES PATENT OFFICE

HARRY B. HULL, OF DAYTON, OHIO, ASSIGNOR, BY MESNE ASSIGNMENTS, TO FRIGIDAIRE CORPORATION, A CORPORATION OF DELAWARE

REFRIGERATING APPARATUS

Application filed March 29, 1924. Serial No. 702,973.

This invention relates to refrigerating system, and particularly to systems of the absorption type in which there is provided a generator absorber which is adapted to be heated and cooled intermittently.

One of the objects of the present invention is to increase the efficiency of the generator absorber by preventing the radiation of the heat from the generator absorber during the heating cycle and by constructing the generator absorber whereby the medium used for cooling same is efficiently utilized.

In carrying out the above object, there is provided a compact structure including a reservoir for the absorbent having an insulating wall which is spaced therefrom, the space forming an air pocket which functions as an insulating wall during the heating cycle of the generator absorber and also as a passage for a cooling medium for the reservoir during the cooling cycle.

Another object of the invention is to further simplify the construction of a generator absorber by minimizing the pipe connections therefor.

Further objects and advantages of the present invention will be apparent from the following description, reference being had to the accompanying drawings wherein a preferred embodiment of one form of the present invention is clearly shown.

In the drawings:

Fig. 1 is a fragmentary sectional view of a refrigerator cabinet showing a refrigerating system including the improved generator absorber.

Fig. 2 is a sectional view of the generator absorber taken on line 2—2 of Fig. 1.

Fig. 3 is a sectional view taken on line 3—3 of Fig. 2.

Referring to the drawings, 20 is a refrigerator cabinet including a food compartment 21 and a cooling compartment 22 suitably insulated from one another by insulation 23, and from the exterior by insulation 24. The food compartment 21 and the cooling compartment 22 are connected by passages 26 and 27 which form passages for the circulation of relatively warm air from the food compartment 21 to the cooling compartment 22, and a cold air passage from the cooling compartment 22 to the food compartment 21, respectively. The food compartment 21 and cooling compartment 22 form an L-shaped wall 29 carrying an L-shaped frame 30. The L-shaped wall 29 forms a wall for a machine compartment 31. A refrigerating apparatus 32 is partly located within the machine compartment 31 and a portion thereof is located in cooling compartment 22, there being an opening 33 in the vertical arm of the L-shaped wall 29 through which portions of the refrigerating system extend from the machine compartment to the cooling compartment.

Frame 30 carries a bracket 36 upon which the refrigerating apparatus is pivoted as at 37. The refrigerating apparatus includes a frame 38 carrying a post 39 which supports the generator 40. Frame 38 also carries a laterally extending arm 41 which projects through the opening 33 and carries an evaporator-condenser 42 located within the cooling compartment 22. Frame 38 carries pipes 43, 44 and 45 at a portion which is adjacent the opening 33. One end of pipe 43 is connected with a water receiver 47 located within the machine compartment 31 and at the other end with a reservoir 48 carried above the evaporator-condenser 42. Reservoir 48 has a plurality of outlet pipes 49 for conducting water to the upper surface of the evaporator-condenser 42. One end of pipe 44 is connected to a valve 50 located in the machine compartment and the other end of said pipe is connected to the upper end of a head 51 of the evaporator-condenser 42. Pipe 45 is connected at one end with the valve 50 and at the other end to the lower end of head 51. Pipes 43, 44 and 45 extend through the passage 33.

Generator absorber 40 is connected by pipes 53 and 54 with the valve 50. The receiver 47 is provided with two compartments 55 and 56 which are separated by wall 57. Pipe 43 is connected with compartment 56 and a pipe 58 connects the compartment 55 with the generator absorber 40. A water tank 60 is located above the receiver 47 and is provided with an inlet pipe 61 and an overflow pipe 62. A spout 63 is adapted to conduct water from the tank 60 into either the compartment 55 or 56, as the case may be.

The entire refrigerating apparatus including the frame 38, generator absorber 40, valve 50, receiver 47, evaporator-condenser 42 and the connecting pipes comprise a unit which is pivotally mounted upon the bracket 36 at 37.

The generator absorber 40 includes a cylindrical reservoir 70 having end walls with annular flanges 71 and 72. The end walls of the reservoir are insulated by insulating walls 73, and the cylindrical wall is provided with an insulating wall 74. Lugs 75 are provided on the cylindrical surface of the reservoir 70 and form spacers whereby the wall 74 is spaced from the reservoir 70. Pipes 53 and 54 extend through the wall 74 and into the reservoir 70. Pipe 54 terminates adjacent the upper end of the reservoir while the pipe 53 projects to substantially near the bottom thereof. An electrical heating coil 76 is located within the reservoir 70 and extends through the wall 73. The ends of the electrical heating coil are connected by terminals 78 and 79 which are adapted to dip into cups 78ᵃ and 79ᵃ to complete the circuit to the coil. The pipe 58 extends through the wall 74 and terminates above the reservoir 70. A drain pipe 81 extends through the lower part of wall 74. Water is adapted to be conducted through pipe 58 and over the generator 70 and thence to the drain pipe 81. The outside walls of the reservoir 70 carry a plurality of inclined baffles 82 for conducting water so that it will flow over substantially the entire area of the cylindrical wall of the reservoir.

The function of the valve 50 is to control the flow of the refrigerant in the pipes 44, 45, 53 and 54. When the refrigerating apparatus is in the position shown, the valve 50 is tilted to such a position that the liquid therein immerses the end of pipes 45 and 54 to prevent the passage of refrigerant therethrough. When the refrigerator is tilted to its other position, inter-communication is established between the pipes and the interior of the valve.

A cup 83 carried by a wall of compartment 22 is adapted to receive a stud 84 carried by head 51. This cup receives water from the pipe 49 in a manner not shown. After the apparatus has moved to the position shown, the water is frozen in the cup and locks stud 84 in position for a purpose to be described.

In the position shown in Fig. 1, the heating coil 76 is rendered inoperative and the refrigerating apparatus is tilted to such a position that the water from tank 60 is being conducted by spout 63 into compartment 55, whereby water is being conducted over the surface of the reservoir 70 through the pipe 58. Water flowing over the reservoir 70 will cool the absorbent therein, causing said absorbent to absorb the refrigerant medium. The vaporized refrigerant within the evaporator-condenser 42 will flow through pipe 44 into the valve 50. Since the outlet to pipes 45 and 54 are now closed, the refrigerant must pass through pipe 53 and thence pass to the lower portion of the reservoir 70 where it is absorbed by the absorbent within the reservoir 70 as it bubbles therethrough. This cycle of operation continues until substantially all the refrigerant is vaporized within the evaporator-condenser and as the cooling compartment increases in temperature the ice within the ice-lock cup 83 melts to release the ice stud 84. Since substantially all the refrigerant has now been absorbed within the reservoir 70, that portion of the apparatus which is within the compartment 31 will be heavier than the portion in compartment 22 and the refrigerating apparatus will move about the pivot 37. When this occurs terminals 78 and 79 will make electrical connections with the mercury in the cups 78ᵃ and 79ᵃ to complete the circuit to the heating coil 76. When this tilting operation takes place the receiver 47 is also moved whereby the water from the tank 60 will be conducted to the compartment 56 through the spout 63. This water will then flow through pipe 43 into the reservoir 48 and from there it is distributed into pipes 49 where it will be conducted over the evaporator-condenser 42. Since the evaporator-condenser is now tilted upwardly, the water from pipe 49 will flow over the evaporator-condenser 42 toward the machine compartment. This water will flow through the conduit 41 and will be conducted by a spout 87 to the basin formed by the frame 30.

When the electrical coil 76 is energized the absorbent and refrigerant solution will be heated to drive off the refrigerant. The refrigerant will pass through pipe 54 into the valve 50. The valve 50 now being tilted, the outlet to pipe 45 will be open and the gas will then pass through said pipe into the head 51. The heating cycle continues until substantially all of the refrigerant is driven out of the absorbent, at which time the refrigerant within the evaporator-condenser 42 is of sufficient weight to cause the refrigerating apparatus to tilt to the position shown.

When this occurs the electrical circuit is again broken to the electrical heating coil 76 and the water is again conducted over the surface of the reservoir 70. As the evaporator-condenser becomes cool, due to the absorption of the gas within the generator, the water within the ice-lock cup 83 will freeze and lock the stud 84 in position before the weight of the generator end, due to the absorption of the gas, is sufficient to overcome the weight of the evaporator condenser 42. In this manner the refrigerating apparatus is maintained in the evaporating position after the weight of the generator end is sufficient to overcome the weight of the condenser end.

It is apparent from the foregoing description that the generator absorber is rendered more efficient by insulating the same to prevent the escape of heat by radiation. The air space between the reservoir 70° and the wall 74 also functions as insulation.

Another advantage in the present invention is that the air space is readily cooled when it is desirable to cool the generator absorber. The air space forms a passage for the cooling medium.

Another advantage is the simplicity of manufacture of the present generator absorber. The insulation can be readily mounted upon the generator absorber. Further, only three pipe connections are necessary for the reservoir 70, namely, the connection for pipes 53 and 54, and for the tube 88 which encloses the heating coil 76. In this manner welding operation for the reservoir 70 is minimized.

While the form of embodiment of the invention as herein disclosed, constitutes a preferred form, it is to be understood that other forms might be adopted, all coming within the scope of the claims which follow.

What is claimed is as follows:

1. In a refrigerating system of the absorption type including a generator-absorber, said generator-absorber comprising a substantially horizontally disposed elongated reservoir, end walls abutting the ends of the reservoir, a second wall surrounding the reservoir and connected with said end walls, said second wall being spaced from the reservoir to provide an air insulating chamber surrounding said reservoir, a conduit connected adjacent the top of the chamber for conducting a cooling medium thereto, baffles within said chamber, said baffles being arranged in staggered relation for directing the cooling medium over the surface of the reservoir, and a drain for the chamber adjacent the bottom thereof.

2. In a refrigerating system of the absorption type including a generator-absorber, said generator-absorber comprising a substantially horizontally disposed elongated reservoir, end walls abutting the ends of the reservoir, a second wall surrounding the reservoir and connected with said end walls, said second wall being spaced from the reservoir to provide an air insulating chamber surrounding said reservoir, a conduit connected adjacent the top of the chamber for conducting a cooling medium thereto, baffles within said chamber, said baffles being alternately inclined in opposite directions and arranged in staggered relation for directing the cooling medium over the surface of the reservoir, and a drain for the chamber adjacent the bottom thereof.

In testimony whereof I hereto affix my signature.

HARRY B. HULL.